Jan. 15, 1957     O. M. CIABATTONI     2,777,221
POWER STEERING CONTROL SYSTEM FOR ROAD GRADERS
Filed Oct. 27, 1955

INVENTOR.
ORLANDO M. CIABATTONI
BY
H. W. Brelsford
ATTORNEY

United States Patent Office 2,777,221
Patented Jan. 15, 1957

2,777,221

POWER STEERING CONTROL SYSTEM FOR ROAD GRADERS

Orlando M. Ciabattoni, Santa Barbara, Calif.

Application October 27, 1955, Serial No. 543,214

5 Claims. (Cl. 37—143)

My invention relates to road motor driven scraping machinery and has particular reference to a push button steering system for road scrapers or graders.

Road scrapers have many complex controls in addition to the usual controls of motor speed, gear shifting, brakes and clutch. These additional controls include front wheel tilt, blade scraping angle, blade height, blade bank cutting angle, lateral blade shift, etc. Current models of road scrapers employ six different manual controls to effect these various controls.

The operation of these various controls can be accomplished while the grader is moving in a straight line even if the grade is changed, as when tapering out a ditch. However, when the path is curved it is almost impossible for the operator to manually steer and operate the six controls. As a consequence, the work is often uneven and unsatisfactory, and only the most highly trained operators can turn out acceptable work.

I have devised a steering system that is compatible with the six special controls, and which permits the most accurate steering even while the controls are being operated. This system basically includes steering control elements disposed one each immediately adjacent each of the six control levers or other manual control member. I prefer to have these steering control elements electrical in nature and this permits the use of punch button switches. The operator may then press a steering button with one or more fingers of the same hand that is operating one of the control levers. Control of the grading or scraping operation is assured since the operator does not have to remove his grasp of the grading controls to grab and operate a steering wheel.

It is therefore a general object of my invention to provide a steering system for road graders that can be manually operated simultaneously with manual operation of a multiplicity of manual grading controls.

Another object is to provide a road grader with a multiplicity of steering elements disposed respectively adjacent a multiplicity of grading control elements.

A further object is to provide an electrical steering control system for road scrapers, providing instant steering control.

Still another object is to provide a grader steering system having electrical switches disposed adjacent to grader controls of handy steering of a grader.

Other objects and advantages of my invention will be apparent in the following descriptions and claims considered together with the accompanying drawings forming an integral part of this specification and in which:

Figure 1:
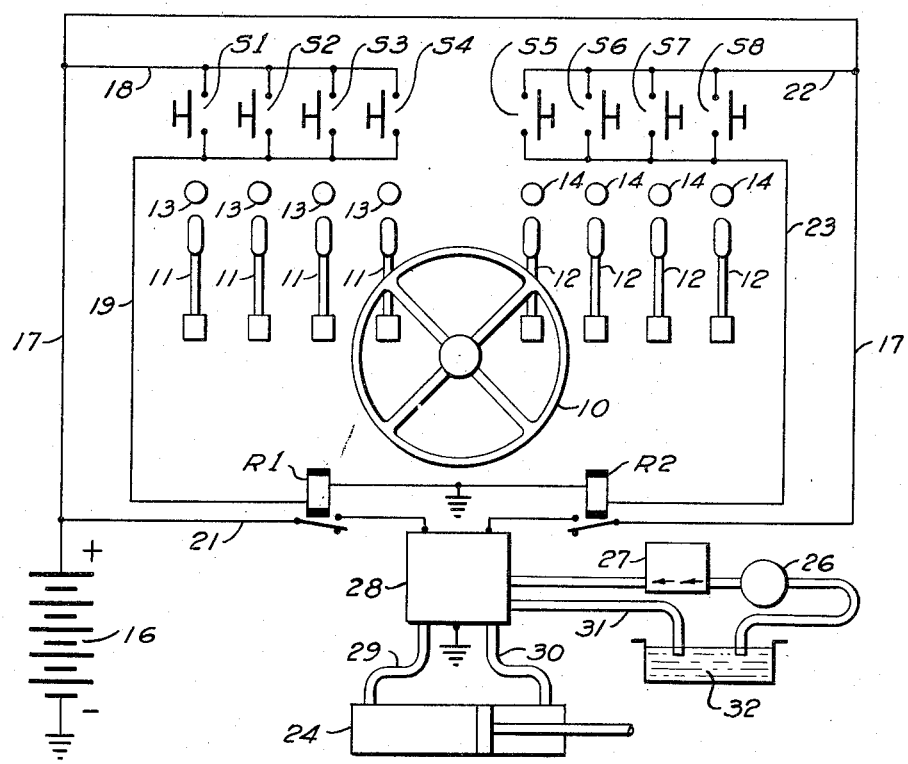
Fig. 1 is an electrical and hydraulic schematic drawing of a circuit embodying my invention as superimposed upon a set of manual grading controls and a steering wheel for a grader.

Referring to Fig. 1 there is illustrated a steering wheel 10 which is conventionally provided in most road graders. The usual grader also provides a series of handles 11 disposed to the left of the steering wheel and a series of handles 12 disposed to the right of the steering wheel. These vary in number according to the design and manufacture from four to nine in number and operate various controls as mentioned previously, such as the left blade lift, scarifier, circle reverse, blank for other attachments, hydraulic shift for mold board, circle side shift, leaning wheels, right blade lift, etc. In other words, these levers are not connected necessarily with a left movement or right movement of any part of the grader but merely provide a convenient area for operations which are necessary in the aggregate. These levers for the control of the grading operations are generally manual clutch levers to engage rotating members to apply rotating mechanical power to a member in one direction or the other. In other makes of graders they are hydraulic valves which can be operated in one direction or the other to effect a directional movement of a hydraulic motor.

In applying electric steering control in accordance with my invention I have discovered that this is best done by placing control that will cause steering to the left at a position which is natural for the driver, namely, a position to the left of the center of the operator's position which is generally immediately at the steering wheel 10. Correspondingly, a control which will cause steering to the right is best disposed on the right side of the steering wheel 10. Therefore, the operator will instinctively touch the proper steering control according to the direction he desires to turn. While this steering control could be another added lever 11 or 12, I provide this control in accordance with my invention immediately adjacent one of the grading controls so that it can be operated while operating one of the grading controls. Thus multiplication of vehicle controls is reduced from a practical standpoint by this consolidation. Further, I have discovered that this steering can be effected most readily if the steering control element is available at all of the grading control members. I prefer to use a number of switches to effect this availability of controls at each grading control element. Further, I have found that a push button switch of the two point make is a satisfactory type of switch.

Referring again to Fig. 1, the push buttons for left hand turning are designated by a number of large discs 13 disposed opposite or adjacent to the manual controls 11. These are so disposed that when the operator has his hand upon one of the manual controls 11 he may project forward his fingers to contact one of the switch buttons 13, or he may momentarily release the control and merely strike the buttons 13 until sufficient time of contact is achieved to give the desired amount of steering turning. Immediately adjacent to or opposite the right hand controls 12 may be a series of discs 14 preferably one for each control 12.

The electrical circuit in which the switches may be operated may be energized by any suitable source such as a generator and for this purpose a storage battery 16 is illustrated having a conductor 17 leading therefrom from which extends a branch conductor 18 leading to contacts on series of parallel switches S1, S2, S3, and S4. A conductor 19 may be connected to the opposite point of the two point switches and may lead to a relay R1 which, in turn, may close its own switch disposed in a branch conductor 21 from the battery conductor 17. The switches for right hand steering are designated as S5, S6, S7 and S8 and may receive potential from a branch conductor 22 and the opposite points of the switches may be connected to a conductor 23 leading to a relay R2 having its switch connected to the terminus of the battery conductor 17.

In Fig. 1 a hydraulic steering motor 24 is illustrated receiving its power from a pump 26 which delivers liquid under pressure to an accumulator 27 connected to a solenoid valve 28. Conduits 29 and 30 may lead from this solenoid valve to opposite ends of the double acting motor 24 and an exhaust conduit 31 may lead to a reservoir 32 from which the pump 26 draws liquid. The steering motor 24 may be directly connected to the steering mechanism for the road grader in any conventional fashion and hence this connection is not illustrated.

Figure 2:
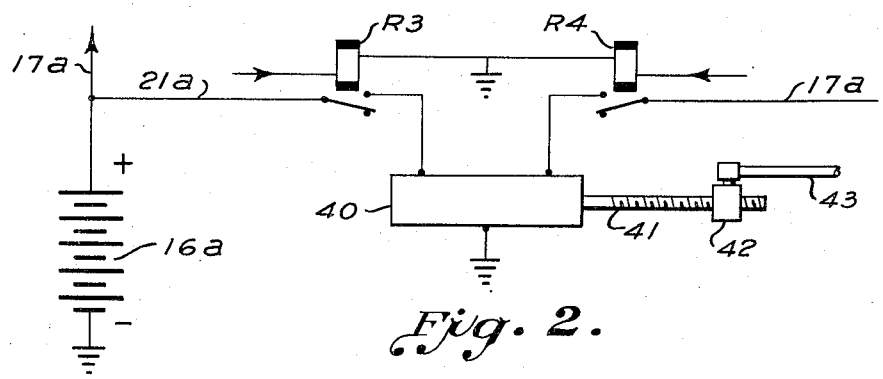
Fig. 2 is a fragmentary schematic wiring diagram showing the invention as applied to an electric motor for steering the grader.

The system of Fig. 1 is an electro-hydraulic system. There is illustrated in Fig. 2 a fragment of the system of Fig. 1 as it may be applied to an electric steering motor. Accordingly, a source of potential such as a storage battery 16a may supply current to a branch conductor 21a and to the terminus of the battery conductor 17a. A relay R3 may be energized similarly to the relay R1 of Fig. 1 and a relay R4 may be energized similarly to the R2 in Fig. 2. These relays may connect an electric motor 40 to the battery 16a in a directional fashion so that operation of relay R3 will cause the motor 40 to rotate in a direction to cause steering to the left and relay R4 may close to cause directional steering to the right. There is schematically illustrated a threaded shaft 41 driven by the motor on which a non-rotatable nut 42 may be located which, in turn, may drive a steering knuckle 43 of the conventional steering mechanism of a road grader. It will be appreciated by those skilled in the art that such a motor drive is purely schematic and that gear reduction and other refinements are necessary to give effective steering.

The operation of the system of Fig. 1 is as follows. An operator disposed behind the steering wheel 10 may actuate the control levers 11 and 12 to effect transverse grading functions of the grader. That is, control of the elevation of the blade, its angle in a horizontal plane with respect to the longitudinal axis of the grader, effect its lateral displacement, effect rotation of the blade in a vertical plane, effect leaning of the front wheels, movement of the scarifier, or effect other controls for grading purpose. If at the same time a change in direction of the grader is required the operator may extend his fingers from the control levels 11 to strike the left hand buttons 13, any one of which will close respective switches S1, S2, S3 or S4 to cause left hand steering. This is effected through the relay R1 which may close to cause current to flow through the branch conductor 21 to the solenoid valve 28 which, in turn, directs fluid under pressure to the proper end of the hydraulic steering motor 24 to cause the wheels of the grader to turn to the left.

If steering to the right is desired, the operator merely strikes or touches one of the switch buttons or discs 14, any one of which will close the respective switches S5, S6, S7 or S8 to actuate the relay R2 which causes current to flow into an opposite terminal of the solenoid valve 28. The solenoid valve 28 will then cause fluid under pressure to go to the other end of the hydraulic motor 24 causing it to actuate in the opposite direction to cause steering to the right.

The operation of the device of Fig. 2 is similar insofar as switch closing is concerned and when the relay R3 is actuated it causes the electric motor 40 to rotate in a direction that will pull on the non-rotatable nut 42 to effect turning to the left. Actuating the relay R4 will cause the electric motor 40 to rotate in the opposite direction causing an opposite movement of the nut 42 to give steering to the right.

It will be appreciated by those skilled in the art that various modifications may be made in the invention without departing from the true spirit nad scope of my invention. For example, relays might be eliminated, with direct connections to a solenoid valve, electric motor, or other steering control. Likewise, other power steering may be employed, such as a take-off from a member mechanically driven by the grader motor. Other switch connections could be used and additional switches or fewer switches would be used as desired according to the convenience of the operator. In any of these events, the prime purpose is achieved of control of steering without the necessity of mechanically grasping the steering wheel 10 and instead, operating the steering electrically by switch contact. For these and various other reasons I do not limit myself to the precise circuits shown, but claim all such modifications and variations as fall within the true spirit and scope of my invention.

I claim:

1. In a road grader having power steering and a driver's position and a plurality of manual grading controls disposed to the left and a plurality of manual grading controls disposed to the right of the driver's position; a power steering control system comprising: a source of hydraulic fluid under pressure, a double acting hydraulic motor connected to the steering system of the road grader, a reversing solenoid valve connected to the source of hydraulic fluid and to the hydraulic motor, and having a left turn terminal and a right turn terminal; a source of electrical potential; a plurality of electric switches connected in parallel and disposed one each opposite each left manual grading control; a left relay connected to one side of said switches; a conductor connecting the other side of said switches to the source of potential; a conductor connecting the left turn terminal of the solenoid valve to the source of potential through the switch of the left relay; a plurality of switches arranged in parallel disposed one each opposite the right hand grading controls; a right relay connected to one side of said parallel switches; a conductor connecting the other side of said parallel switches to the source of potential; and a conductor connected to the right turn terminal of the solenoid valve through the switch of the right relay whereby actuation of any one switch opposite the right hand grading controls will cause turning of the grader to the right and actuation of the switch opposite any of the left grading controls will cause steering of the grader to the left.

2. In a road grader having power steering, a driver's position, a plurality of manual grading controls disposed to the right of the position and a plurality of manual grading controls disposed to the left of the position; a power steering control system comprising: a steering motor; a right steering control for the motor; a left steering control for the motor; a plurality of electric switches disposed immediately adjacent to the left manual grading controls; connections from these left switches to the left steering motor control; a plurality of electric switches disposed immediately adjacent to the right manual grading controls; and connections from these right switches to the right steering control, permitting the operator to steer the grader while operating the grader controls by merely actuating a switch adjacent to his control.

3. A road grader steering control system as set forth in claim 2 wherein the switches correspond in number to the grading controls.

4. A road grader steering control system as defined in claim 2 wherein the steering motor is a hydraulic motor having an electrically controlled valve.

5. A road grader steering control system as set forth in claim 2 wherein the steering motor is an electric motor having controlled rotation in both directions to effect right and left steering.

References Cited in the file of this patent

UNITED STATES PATENTS

| | | |
|---|---|---|
| 2,454,070 | Le Tourneau | Nov. 16, 1948 |
| 2,464,110 | Wright | Mar. 8, 1949 |
| 2,531,061 | Le Tourneau | Nov. 21, 1950 |
| 2,724,517 | Lewis | Nov. 22, 1955 |
| 2,728,463 | Beckwith | Dec. 27, 1955 |